United States Patent [19]

Ishii

[11] Patent Number: 4,586,295
[45] Date of Patent: May 6, 1986

[54] WORKPIECE CENTERLESS SUPPORT DEVICE FOR USE IN INTERNAL GRINDING MACHINE

[75] Inventor: Katsutoshi Ishii, Narashino, Japan

[73] Assignee: Seiko Seiki Kabushiki Kaisha, Chiba, Japan

[21] Appl. No.: 684,609

[22] Filed: Dec. 21, 1984

[30] Foreign Application Priority Data

Dec. 26, 1983 [JP] Japan .......................... 58-200928[U]

[51] Int. Cl.$^4$ ................................................ B25B 5/00
[52] U.S. Cl. .................................. 51/236; 51/103 R; 51/103 WH
[58] Field of Search .............. 51/236, 103 R, 103 WH

[56] References Cited

U.S. PATENT DOCUMENTS 2,716,311   8/1955   Berstecher ........................... 51/236

Primary Examiner—Frederick R. Schmidt
Assistant Examiner—J. T. Zatarga
Attorney, Agent, or Firm—Robert E. Burns; Emmanuel J. Lobato; Bruce L. Adams

[57] ABSTRACT

In the internal grinding machine intended to perform the concentric bore processing, rotatably supporting the workpiece of which bore is processed in the previous processing step, a workpiece centerless support device for use in the internal grinding machine, comprises of an internal shoe which penetrates the internal bore of the workpiece and contacts with two points internally thereof so as to rotatably support the workpiece; a couple of drive rolls arranged on both side portion of the internal shoe; a couple of spring means which energizes each drive rolls toward the circumference of the workpiece and of which spring pressure is determined in alternatively differential rate so that the contacting location against the internal shoe of the workpiece is always preserved in the side of two contact points; a pusher plate which is inserted from end portion of the workpiece to surround the circumference of the workpiece; an outlet of coolant which is provided on the pusher plate in a manner of being opposed to the other surface of the workpiece.

1 Claim, 4 Drawing Figures

WORKPIECE CENTERLESS SUPPORT DEVICE FOR USE IN INTERNAL GRINDING MACHINE

BACKGROUND OF THE INVENTION

This invention relates to a workpiece centerless support device of the internal grinding machine.

PRIOR ARTS

For instance, in a workpiece like an injection nozzle, firstly the large bore portion thereof is ground and next the nozzle steam valve portion of the top of the large bore is successively ground. As set forth above, in the case that the bore machining is carried out in the previous stage and the concentric bore machining is successively carried out in the next stage in a manner of rotatably supporting the workpiece, and in the processing manner of transferring the workpiece from the one to another grinding machine, the external diameter of the workpiece is chucked so as to support the workpiece. As a result, the concentricity of the workpiece is not performed in good accuracy.

Accordingly, in the conventional case, the concentric bore processing is carried out in good accuracy by measuring the internal diameter of the workpiece processed in the previous stage to select to the lot respectively and by mounting the workpiece to the taper mandrel with the size corresponding to each lot. In another conventional case, the workpiece is supported in a centerless manner being always energized to the one side by rotatively supporting the workpiece to the round internal shoe and by putting the tension-belt on around the circumference of the workpiece.

But, in the former support construction, since it needs to change to the taper mandrel with the size corresponding to the lot in every lot, set-up time is needed for changing and moreover it needs to measure the internal diameter to select the workpiece in every lot. Also, in a belt driven type, it needs to put the belt on and off by mannual operation. As a result, there has been a defect that complete automation can not be attained.

OBJECT OF THE INVENTION

This invention is intended to support the workpiece in a centerless manner in good accuracy and to execute complete automation and laborsaving of machine processing.

DETAILED DESCRIPTION OF THE INVENTION

This invention, which is intended to accomplish said objects, shows an internal grinding machine wherein the workpiece of which bore is processed in a previous stage, is processed with a concentric bore being rotatably supported and it is characterized in that said grinding machine is comprised of an internal shoe for penetrating the one end of the workpiece and contacting with two points internally of the bore to rotatably support the workpiece, a couple of drive rolls arranged upon both sides of the internal shoe, a couple of spring means for energizing each drive roll toward the circumference of the workpiece and providing a differentially predetermined spring pressure as though the workpiece contact point against the internal shoe can locate always in the side of the two contact points, a pusher plate which is contactless to the circumference of workpiece and being inserted from another side of the workpiece to surround the circumference of the workpiece, an outlet of coolant arranged upon the pusher plate against the another end face of the workpiece.

3 ... a drive roll
4 ... an internal shoe
13 ... a spring unit
22 ... a pusher plate
22a ... a fluid passage of coolant.

PREFERRED EMBODIMENT OF THE INVENTION

Figure 1:
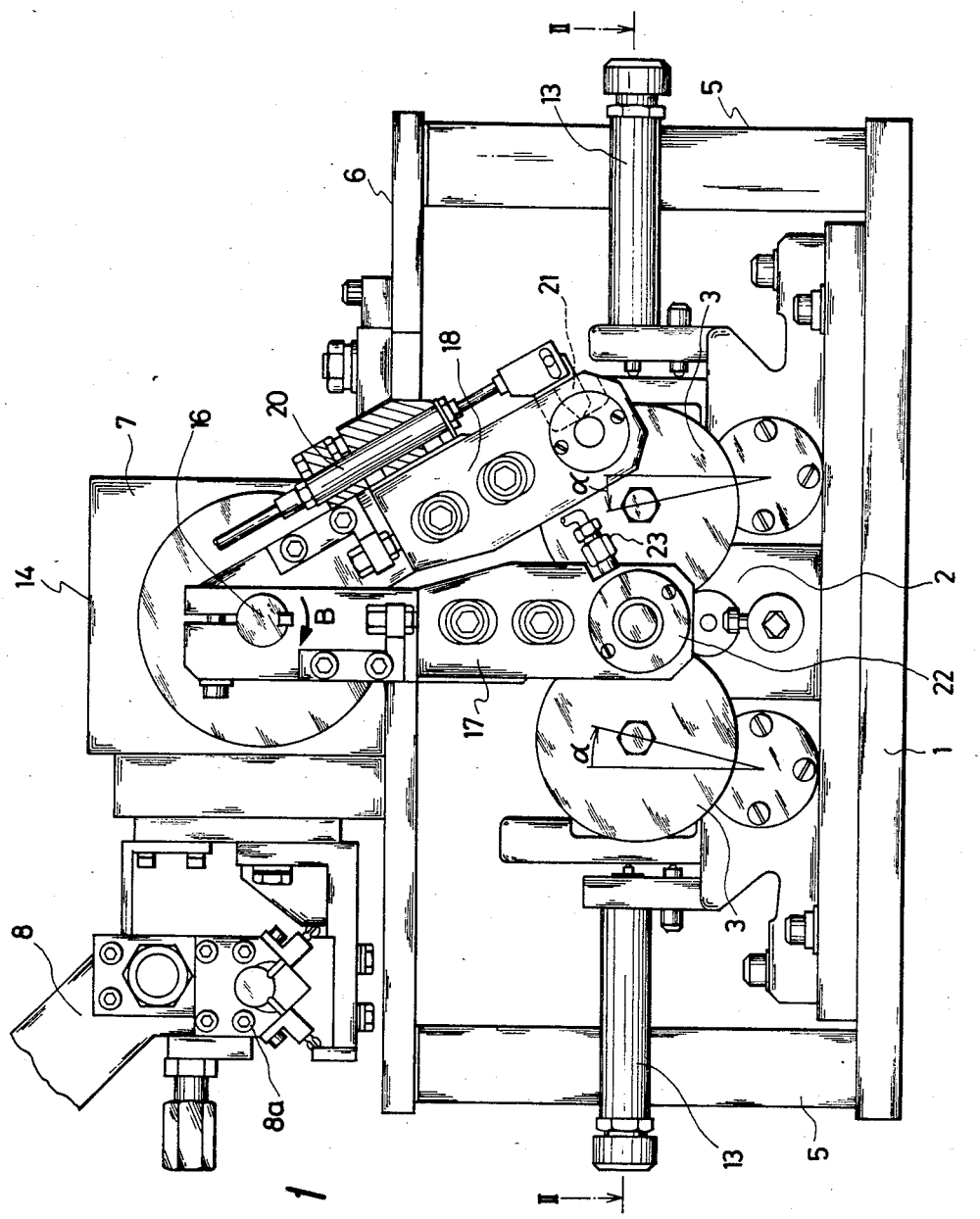
FIG. 1 is a front elevated view of the head stock of the internal grinding machine of this invention.
Figure 2:
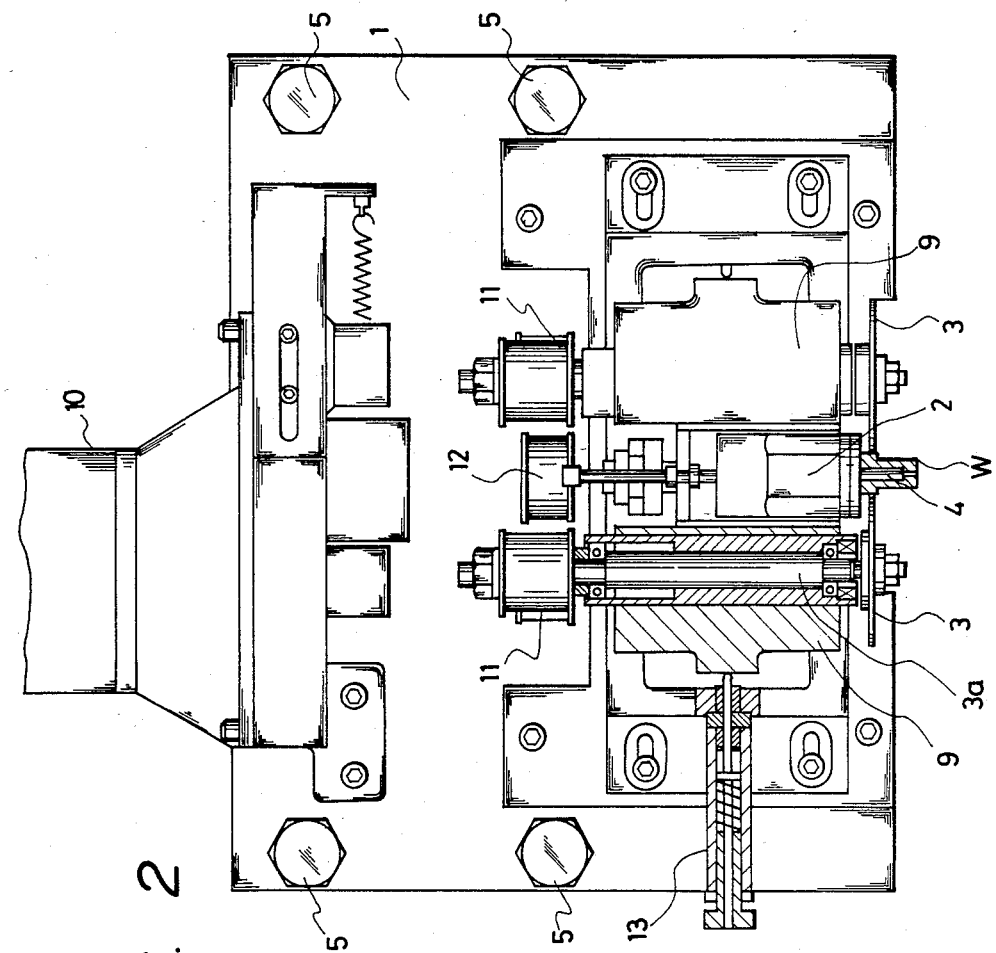
FIG. 2 is a cross-sectional view of the FIG. 1 taken along II—II line.

FIG. 1 shows a front elevated view of a headstock and a loading unit of the internal grinder of this invention and FIG. 2 is a cross-sectional view taken along a line II—II in FIG. 1.

As shown in the figure, a headstock 2 is provided upon the bed 1. Upon the top of the headstock 2, a couple of drive rolls 3, 3 are provided and upon the center thereof, an internal shoe is protrusively provided operative to rotatably support the internal diameter of the workpiece W. Also, upon the each corner of the bed 1, posts 5 are provided respectively and upon the upper portion thereof, a frame 6 is provided and furthermore upon the frame 6, a loading unit 7 and a loading chute 8 are provided respectively.

Figure 4:
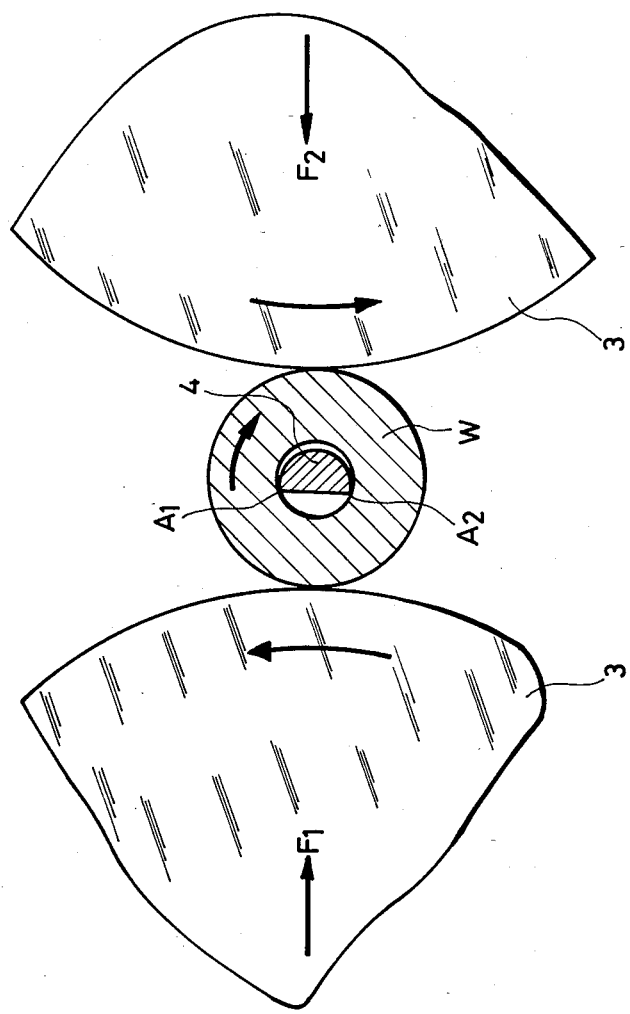
FIG. 4 is a partially elongated cross-sectional view of the FIG. 3 taken along the line IV—IV.

A spindle 3a of said drive roll is rotatably mounted to the pillow block 9 and rotatably connects a pulley 11 protruding from the back portion thereof to the output shaft 12 of the spindle motor 10 arranged on the back portion of the bed 1 intermediary through the belt (not shown). Moreover each pillow block 9 are energized alternatively toward the inside direction by way of a couple of spring unit 13 arranged upon the side portion thereof and thereby support the circumference of the workpiece W enforcedly to effect the rotation thereof. The internal shoe 4 has, as shown in FIG. 4, a nearly semicircular cross section.

Meanwhile, among said spring units 13, the spring pressure of one side is set more strongly than the spring pressure of the other side and thus the enforced pressure $F_1$ against the workpiece W of the drive roll 3, on the side opposed to the corner $A_1$, $A_2$ of the internal shoe 4, becomes larger than the enforced pressure $F_2$ of the drive roll 3 of the other side and thereby the corners $A_1$, $A_2$ of the internal shoe 4 contacts with two points internally of the workpiece W. That is, as the internal surface of the workpiece W is contacted with two points of said internal shoe 4, the workpiece is adapted to be supported in centerless manner in good accuracy. Said loading unit is composed of a loading shaft 16 rotatably and elusively protruded at the spindle block 14 which is provided on the plate 6 and the first loading arm 17 fixed to the end portion of said loading shaft and operable to serve as both charging and supporting the workpiece and the second loading arm 18 for discharging the workpiece. The drawing shows a state that said first loading arm is positioned at the work processing location.

In order to discharge the workpiece from this situation, firstly, the loading shaft 16 protrudes and rotates by predetermined angle toward the direction of arrow B and thus make the end of the second loading arm 18 to be positioned at the work processing location and next, said loading shaft 16 retracts again. As result of this, the end of the second loading arm 18 surrounds the circumference of the workpiece.

Figure 3:
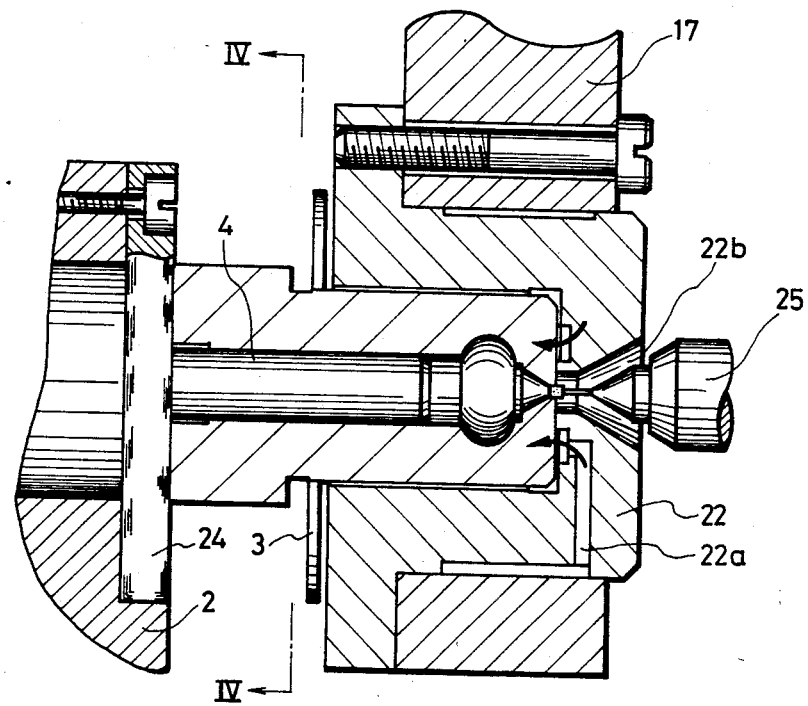
FIG. 3 is a partially elongated cross-sectional view of the FIG. 1 taken along the line III—III.

Additionally, at the side of the loading arm 18, there is provided with a cylinder 20 and a clamp plate 21, which effects clamping or unclamping of the workpiece cooperative to the cylinder 20, is provided at the work gripping portion and thus the workpiece W can be gripped by driving said cylinder 20. From this situation, the spindle block 3 on the head stock 2 moves around toward the direction of arrow α. In this situation, as the loading shaft 16 protrudes again, the workpiece departs from the processing position and as each loading arms 17, 18 rotate toward the direction of arrow B, the first loading arm 17 comes to the charging portion of the charging chute 8 so that it can grip the next unfinished workpiece at the end portion thereof. On the other hand, the workpiece, which is gripped by the second loading arm 18, is discharged to the discharging location (not shown). Next, the first loading arm 17 comes to the work processing location by driving the loading shaft by reverse motion from above described and thus each drive rolls 3 comes to the position shown in the drawing. The pusher plate 22, as shown in the enlarged view of FIG. 3, surrounds the circumference of the one end of the workpiece W and is provided with a fluid passage 22a of coolant which is adapted to communicate with by way of a connection fitting arranged on the side of the loading arm 17 and the discharge hole of the fluid passage 22a is opposed to the end portion of the workpiece W. Accordingly, coolant which passes through within the fluid passage 22a by way of a connection fitting, gush toward the arrow direction in the drawing, that is, toward the pushing direction of the workpiece W and thus coolant pushes the workpiece W against the master plate 24 provided to the base portion of said internal shoe 4 so as to determine the axial position of the workpiece. Further, in this state, the grinder 25 is charged through the discharge opening 22b arranged on the central portion of the pusher plate 22 so as to carry out the processing of the small bore of end portion of the workpiece W.

EFFECT OF THE INVENTION

This invention is composed of as above mentioned and thus the positioning of the workpiece to the axial direction can be carried out in good accuracy.

Also, in this invention, it is no need to detect the internal diameter of the workpiece which is processed in the previous processing step and it is capable to execute complete automation of loading and unloading operation of the workpiece. As a result, it can serve to laborsaving and automation of the processing.

I claim:

1. In the internal grinding machine intended to perform the concentric bore processing, rotatably supporting the workpiece of which bore is processed in the previous processing step, a workpiece centerless support device for use in the internal grinding machine, comprises of an internal shoe which penetrates the internal bore of the workpiece and contacts with two points internally thereof so as to rotatably support the workpiece; a couple of drive rolls arranged on both side portion of the internal shoe; a couple of spring means which energizes each drive rolls toward the circumference of the workpiece and of which spring pressure is determined in alternatively differential rate so that the contacting location against the internal shoe of the workpiece is always preserved in the side of two contact points; a pusher plate which is inserted from end portion of the workpiece to surround the circumference of the workpiece; an outlet of coolant which is provided. on the pusher plate in a manner of being opposed to the other surface of the workpiece.

* * * * *